United States Patent [19]

Sturm et al.

[11] Patent Number: 5,342,560
[45] Date of Patent: Aug. 30, 1994

[54] METHOD FOR THE PRODUCTION OF FOAMED POLYSTYRENE FILMS

[75] Inventors: Wilfried Sturm, Düsseldorf, Fed. Rep. of Germany; John Fumei, Oldsmar, Fla.

[73] Assignee: Gerro Plast GmbH, Dusseldorf, Fed. Rep. of Germany

[21] Appl. No.: 982,066

[22] Filed: Nov. 25, 1992

Related U.S. Application Data

[63] Continuation of Ser. No. 671,409, Mar. 19, 1991, abandoned.

[30] Foreign Application Priority Data

Apr. 5, 1990 [DE] Fed. Rep. of Germany ....... 4011003

[51] Int. Cl.$^5$ ............................................. B29C 67/22
[52] U.S. Cl. ................................. 264/45.9; 264/50; 264/288.8; 264/DIG. 5
[58] Field of Search .............. 264/288.8, 45.9, 50, 264/51, 53, 54, DIG. 5, DIG. 9, DIG. 10

[56] References Cited

U.S. PATENT DOCUMENTS

| | | | |
|---|---|---|---|
| 3,275,720 | 9/1966 | Ohsal | 264/48 |
| 3,723,586 | 3/1973 | Foster et al. | 264/53 |
| 3,920,876 | 11/1975 | Albert et al. | 264/45.1 |
| 4,048,208 | 9/1977 | Spicuzza, Jr. et al. | 264/53 |
| 4,071,597 | 1/1978 | Karabedian | 264/46.1 |
| 4,087,222 | 5/1978 | Noel | 264/48 |
| 4,107,354 | 8/1978 | Wilkenloh et al. | 264/50 |
| 4,198,363 | 4/1980 | Noel | 264/50 |
| 4,207,402 | 6/1980 | Sprenkle, Jr. | 521/39 |
| 4,463,861 | 8/1984 | Tsubone et al. | 264/45.9 |
| 4,470,938 | 9/1984 | Johnson | 264/50 |
| 4,579,701 | 4/1986 | Park et al. | 264/DIG. 15 |
| 4,649,001 | 3/1987 | Nakamura et al. | 264/50 |
| 4,746,477 | 5/1988 | Wecker et al. | 264/53 |
| 4,747,983 | 5/1988 | Colombo | 264/50 |
| 4,980,101 | 12/1990 | Beck et al. | 264/288.8 |
| 5,082,608 | 1/1992 | Karabedian et al. | 264/46.1 |

FOREIGN PATENT DOCUMENTS

| | | |
|---|---|---|
| 55437 | of 0000 | European Pat. Off. |
| 1525940 | of 0000 | France |
| 706673 | 5/1968 | France |
| 60-060138 | 4/1985 | Japan |

*Primary Examiner*—Allan R. Kuhns
*Attorney, Agent, or Firm*—Brooks & Kushman

[57] ABSTRACT

The invention relates to a method of producing a multilayer, preferably two-layer, sandwich of a foamed polystyrene film with a co-extruded unfoamed film, in particular for further working into labels or shaped bodies utilizing the shrinkability of the films, in which a polystyrene resin composition, together with nitrogen as expansion agent and a pore-former, is extruded out of the nozzle of an extruder and the extruded composition is expanded prior to cooling to below the softening point. In order to obtain a production of foamed polystyrene films which is economical as to material and is as unsusceptible to breakdown as possible and also as insensitive to aging as possible and readily printable, the invention proposes that, as expansion agent, there be used exclusively per kilogram of foamed film 1/30 to 1/50 nitrogen (measured in standard liters) of the weight per unit area of the film (measured in grams per square meter), in combination with a powdered mixture of sodium bicarbonate and citric acid, and that the stiffness/surface-nature of the film be controlled by the expansion ratio.

20 Claims, 2 Drawing Sheets

METHOD FOR THE PRODUCTION OF FOAMED POLYSTYRENE FILMS

This is a continuation of copending application(s) Ser. No. 07/671,409 filed on Mar. 19, 1991, now abandoned.

FIELD AND BACKGROUND OF THE INVENTION

The present invention relates to a method for the production of foamed polystyrene films as used, for instance, for the manufacture of shaped bodies, i.e. cups, food containers or the like, but also for the production of labels. In particular, the invention relates to a method of producing a multi-layer preferably two-layer laminate of a foamed polystyrene film with a co-extruded, preferably unfoamed film, especially for further working into labels or shaped bodies, utilizing the shrinkability capacity of the films. In this connection, a polystyrene resin composition is extruded together with nitrogen or carbon dioxide as expansion agents and a pore-former from the nozzle of an extruder and the extruded mass is inflated before cooling to below the softening point.

One method for the manufacture of the polystyrene films indicated above is known from European Patent 55437. In it, carbon dioxide and nitrogen are mentioned in each case as possible expansion agents. The films produced are, however, unsatisfactory, particularly for the manufacture of labels. A relatively rough surface and thus poor printability result. The further working into containers can also only be poorly effected with such a film. A certain stiffness of the film and a thickness of film which can be set within the narrowest possible limits is necessary.

Starting from the above prior art, the object of the present invention is so to development the method for the production of foamed polystyrene films as to result in a production of foamed polystyrene films which is economical as to material and as unsusceptible as possible to disturbances and which also is as insensitive as possible to aging and can be readily printed.

SUMMARY OF THE INVENTION

In accordance with the invention exclusively nitrogen (100%), or exclusively carbon dioxide (100%) or possibly a mixture of the two gasses namely, the nitrogen and the carbon dioxide, is used as expansion (or blowing) agent, and the amount of nitrogen or carbon dioxide used is maintained within given limits with respect to the weight (or mass) per unit area of the film. Per kilogram of foamed film, the amount of nitrogen dispensed, in standard or normal liters (NL), is numerically equal to a fraction 1/30 to 1/50 of the weight per unit area of the film, measured in grams per square meter. For example, if the film weight (or mass) per unit area were 150 g/m$^2$, the fraction 1/30 of the weight per unit area would give a value of 5 liters of nitrogen per kilogram of the foamed film. In the case of the carbon dioxide, the foregoing fraction has a range of 1/20 to 1/35. In the case of a mixture of nitrogen and carbon dioxide, a corresponding fractional range results. By the exclusive use of nitrogen as expansion agent, it is possible drastically to reduce the proportion of pore-former (or nucleating agent) and nevertheless provide, in addition to a greatly reduced density of the foamed polystyrene film, a film structure the surface of which is suitable for printing and further working, in particular into containers. It has surprisingly been found that even with very small amounts of nitrogen and/or $CO_2$ of about 0.8 to 1.6 NL per kilogram of polystyrene, foam densities within the range of between 250 and 350 grams per liter can be obtained. The film thickness can be increased in view of the reduced density so that the danger of the formation of folds can be effectively counteracted. The reduction in density has the further advantage that the thickness of the film transverse to the direction of extrusion can be more easily controlled, which favors the printability of the films, in particular together with the smaller cross-sectional area of the pores which is established. Nitrogen and/or $CO_2$ used as sole expansion agent is not dissolved in the polystyrene resin or not dissolved to the greatest part ($CO_2$). In addition to the expansion agent, there is used a (chemically) decomposable powdered mixture in particular of sodium bicarbonate and citric acid. As a result of the decomposition, gases such as in particular $CO_2$ are produced. Azodicarbonamide can, for instance, also be used as component. It is possible to control the stiffness of the film by the expansion ratio, i.e. the ratio of the nozzle cross section to the cross section of the following cooling mandrel. The advantage is also obtained that, due to the lack of solubility of the expansion agent, a polystyrene foam film which is insensitive to aging is obtained, which further facilitates the working thereof. This is of particular advantage especially upon the further working of the foamed film utilizing the shrinkability of the foamed film since the time of storage need no longer be taken into account when evaluating the shrinkage behavior. In this connection, the method of the invention is, furthermore, characterized by a maximum degree of compatibility with the environment, since no ozone-damaging gases are used or produced upon the manufacture.

It has surprisingly been found that, with even a proportion of nitrogen of only between 0.5 and two normal liters per kilogram of polystyrene foam with a proportion of pore-former of 0.3% it is possible to decrease the density of the film to below 350 grams per liter. In this way, not only is increased economy of the manufacturing process obtained but, in addition, easier control of the thickness of the film, particularly transverse to the direction of extrusion, as a result of which the desired quality of the film can be reproducibly controlled.

The further working of foamed polystyrene films is generally effected by heating the film to above its softening point. The softening temperature has up to now generally been lowered by using fluorinated chlorinated hydrocarbons (FCHC) as expansion agent in order to keep the consumption of energy upon production as small as possible. One particularly advantageous development of the method of the invention provides for improving the economy of the method of manufacture without the use of such environmentally injurious expansion agents by using a polystyrene resin having an average molecular weight of about $20-32 \times 10^4$ (determined by the gel permeation chromatography method). By suitable mixing of different types of polystyrene, i.e. by mixtures of a high molecular type with a low molecular type, it is possible to optimize of the properties of the material with respect to different criteria. Thus, the required strength and the shrinkability of the foamed film can be provided by the high molecular component and the toughness and wear resistance of the films, which is decisive in order to avoid tears, by the low molecular type of raw material.

The co-extrusion of multi-layer films has the particular advantage that the occurrence of cracks in the edge region of the foamed polystyrene film can be tolerated if said region is covered by another layer.

BRIEF DESCRIPTION OF THE DRAWINGS

The method of the invention will be explained in further detail below with reference to the diagrammatic drawings, in which.

DETAILED DESCRIPTION OF THE PREFERRED EMBODIMENTS

Figure 1:
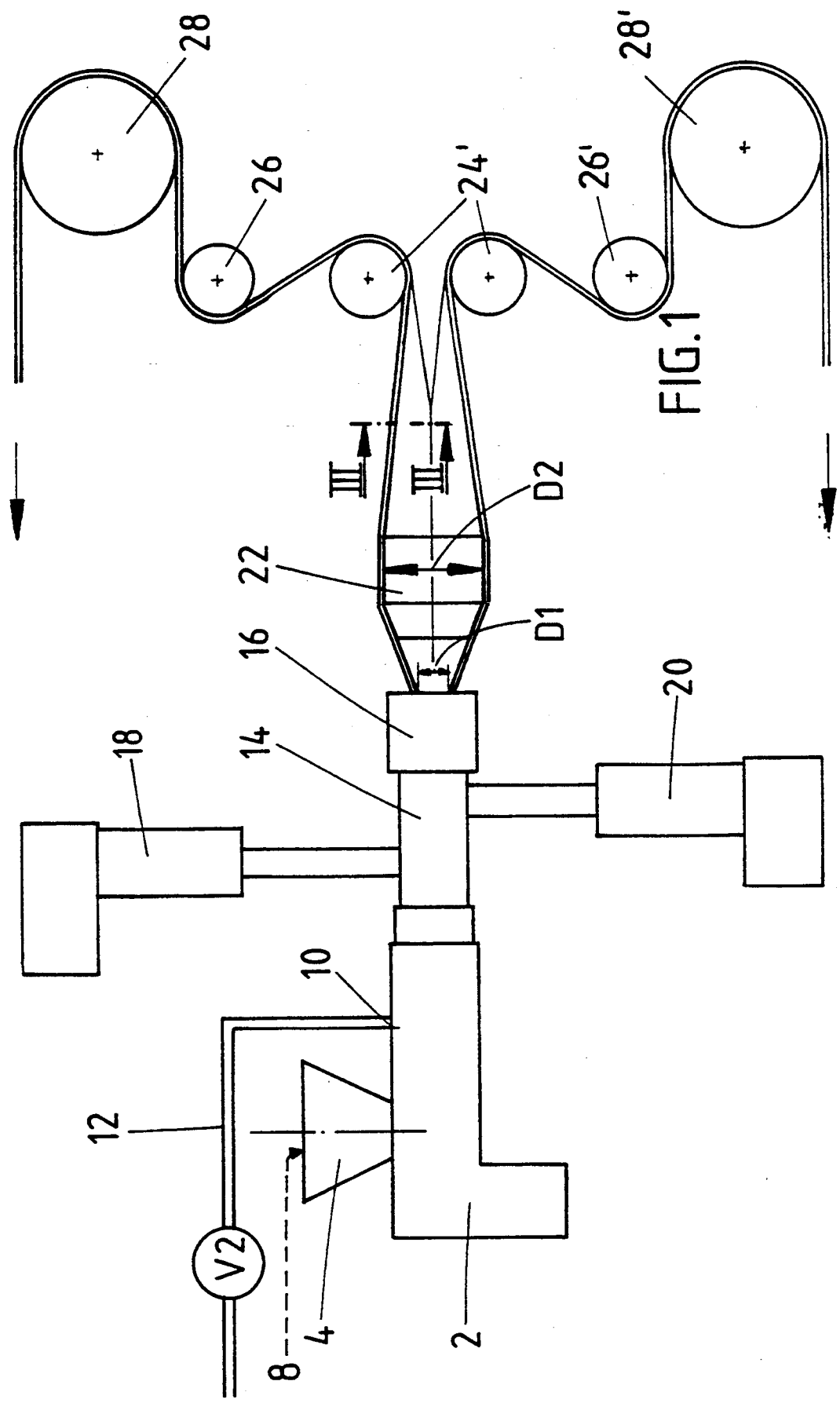
FIG. 1 is a side view of an apparatus for carrying out the method of the invention for the manufacture of foamed polystyrene films.

FIG. 1 shows an extruder 2 which has a feed hopper 4 for the polystyrene resin to be extruded. Within the extruder 2 the polystyrene resin mixture, present possibly as a mixture of different types of polystyrene resin, is melted and kneaded and mixed on the one hand with a pore-former and on the other hand with an expansion agent. For this purpose, pore-formers in the form of a powdered mixture of sodium bicarbonate and citric acid are fed into the extruder 2 directly into the feed hopper 4 at 8.

10 is a connection for a feed line 12 via which expansion agent can be introduced in the form of nitrogen and/or carbon dioxide into the extruder 2. In order to be able to adapt the amount of expansion agent to the rate of passage of the polystyrene resin, a valve means V2 is provided in the feed line 12, it being indicated diagrammatically in FIG. 1.

16 is an extrusion nozzle from which the material, which has been heated above the softening point of the polystyrene resin and treated with the pore-former and the expanding agent, is extruded in the form of a tube. In front of the extrusion nozzle, there is a region 14 by which a multi-layer construction of the foamed polystyrene film can be obtained. To a first layer, which comes out of the extruder 2 into the region 14, there is added from the one side, by means of a second extruder 18, a cover layer and from the other side, by means of a third extruder 20, a base layer so that a 3-layer foamed polystyrene film is given off from the extrusion nozzle 16. This film is expanded by a pre-determined ratio $D_2/D_1$ in which $D_2$ is the diameter of a cooling mandrel and $D_1$ is the diameter of the nozzle outlet. The cooling mandrel 22 has the function of cooling the foamed polystyrene film to below its softening point. The length of the cooling mandrel 22 is so selected that the temperature of the extruded foamed polystyrene film is sufficiently low upon leaving the cooling mandrel 22 to be able to effect further working of the film. 24, 24', 26, 26' and 28, 28' are guide rollers over which the polystyrene film is fed either to a further working station or to an intermediate storage roll after it has been divided by slitting after leaving the cooling mandrel.

Figures 2, 3, 4:
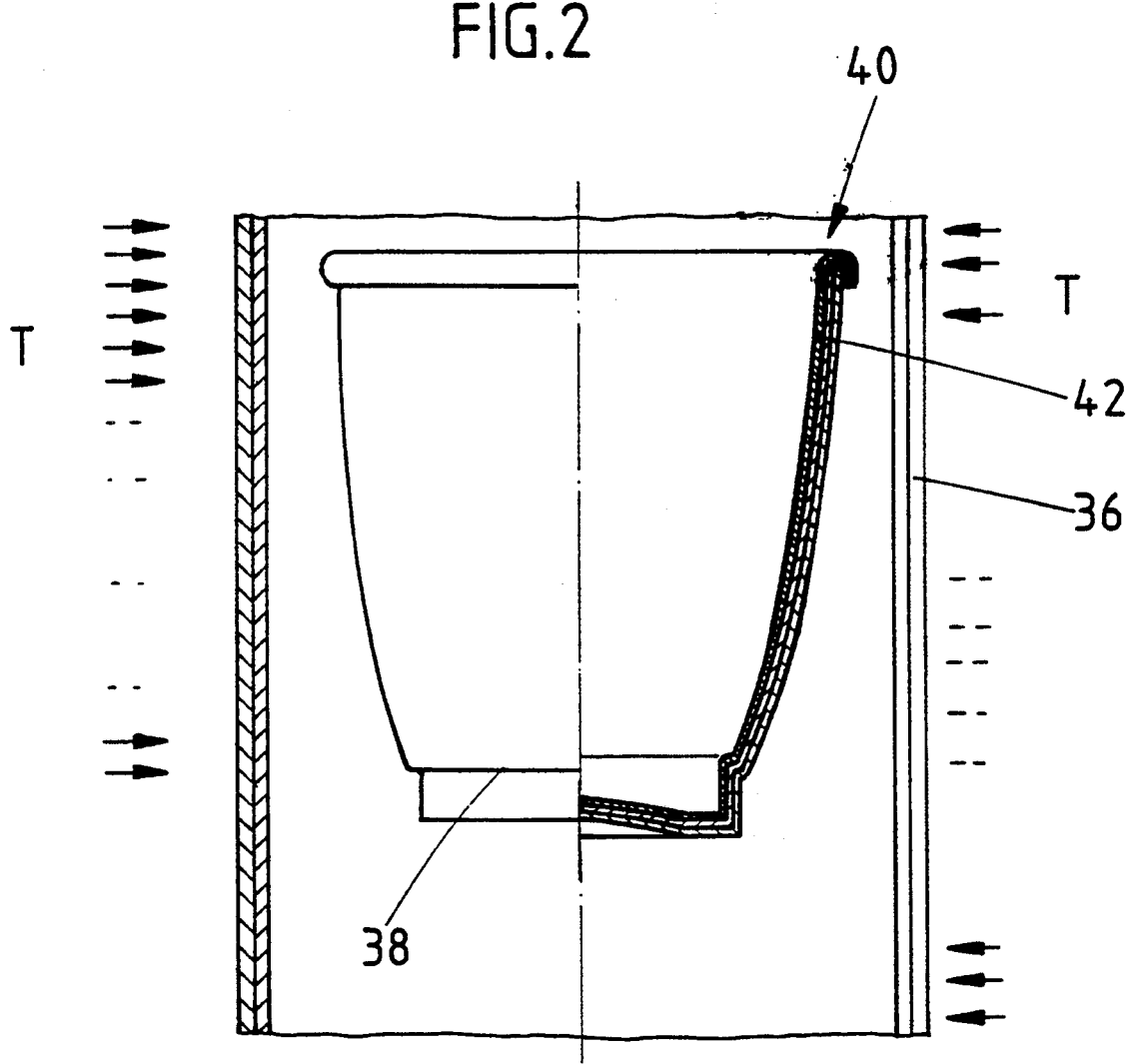
FIG. 2 is a partial sectional view of a body mold which is used for the manufacture of beakers (shown diagrammatically and with the thickness of the film exaggerated)
FIG. 3 shows, on a larger scale, a section through a multi-layer polystyrene foamed film.
FIG. 4 is a separate diagrammatic cross-sectional view through a beaker (in part).

FIG. 3 shows, on a larger scale, a section along the line III—III through the co-extruded polystyrene film. The center region of the film is designated 30, the cover layer 32, and the base layer 34. The layers 32 and 34 can consist of unfoamed material such as, for instance, polystyrene or a combination of polystyrene with other polyolefins. They are applied as co-extrusion cover layer. FIG. 4 shows a diagrammatic partial reproduction of a cross section through a beaker.

The valve means V2 and the feeding of the pore-former are adapted to the rate of passage of the polystyrene resin in the extruder so that the proportion of nitrogen per kilogram of foamed film lies within the range of 1/30 to 1/50 (measured in standard liters) of the weight-per-unit area of the film (measured in grams per square meter), and the proportion of carbon dioxide per kilogram of foamed film is accordingly 1/20 to 1/35. In this case the pore-former lies within the range of 0.2 to 1.0%; in the case of films for the production of labels 0.4 to 0.6% is preferred. Thus, the amount of pore-former used lies within a range which is traditionally maintained when using ordinary expansion agents such as, for instance, fluorinated chlorinated hydrocarbons. There is thus obtained a film density within the range of between 180 and 320 grams per liter, with the result that the thickness of the film transverse to the direction of extrusion can be very easily regulated. By varying the expansion ratio, i.e. the ratio $D_2/D_1$, the stiffness and/or surface of the foamed polystyrene film can be controlled as desired, in order for instance to assure sufficiently good printability and possibilities of further working of the film. In the case of greater stiffness, smaller cells could also be provided or tolerated.

From the above description, it is clear that, in addition to the surprising advantages in the manufacture of the extruded foamed polystyrene film, furthermore only means which are very advantageous from environmental standpoints are employed. In addition, these materials are entirely unobjectionable for use with foodstuffs. In addition to this, it has been found that foamed polystyrene film extruded in this manner is insensitive to aging; the film can thus either be immediately worked further without an aging step, for instance shrunk onto a suitable foam, or else provisionally stored for a long period of time without its working properties being noticeably affected.

FIG. 2 indicates one possibility for the further working of a multi-layer film. In this type of further working, a beaker is formed from a multi-layer polystyrene film 36 under the action of heat, utilizing the shrinkabililty of the film 36. For this purpose, either the freshly extruded film 36 or the tubular film 36 which has been provisionally stored is conducted over a shrinkage core 3. The film 36 is then heated above its softening point, as a result of which the shrinkage process commences. The film 36, with reduction of its volume, comes snugly against the outer surface of the shrinkage core 38. A bottom B is inserted and a mouth roll 42 is developed on the edge region 40.

It has been found that the foamed polystyrene film produced by the method described above is sufficiently stable to exclude, even in the region of the mouth roll 42, the appearance of folds or creases, especially in the region of the circumferential wall of the beaker below the mouth roll.

One example of the manufacture of the foamed polystyrene film will now be described in further detail.

A polystyrene resin having an average molecular weight of about 240,000 was used. The softening point of this polystyrene resin was 94° C. 0.3% pore-former in the form of a powdered mixture of sodium bicarbonate and citric acid was added to the polystyrene resin. As expansion agent, exclusively nitrogen was used in an amount of about 0.8 to 1.6 standard liters per kilogram of polystyrene foam.

A foamed polystyrene film having a film density within the range of between 300 and 350 grams per liter was obtained. This extruded film was pulled over a cooling mandrel so as to obtain a film thickness of about 185 μm. The weight per unit area of the foamed polystyrene film was thus about 57 grams per square meter, suitable for the manufacture of label tubes.

The extruded foamed polystyrene film can be worked without intermediate storage into label tubes, no problems with respect to printability resulting. The polystyrene film can also be used for the manufacture of beakers and bowls, in which connection the development of the mouth roll does not result in any problems here either.

On a following page there is also given a summary of the amounts of consumption of the expansion agents nitrogen and carbon dioxide obtained in accordance with the application, as a function of the thickness, density and weight per unit area of the films.

The features of the invention disclosed in the above specification, drawing and claims may be of importance both individually and in any desired combination for the reduction of the invention to practice.

|  | Physical Data | | | Consumption Amounts | | |
|---|---|---|---|---|---|---|
| Application | Thickness (μm) | Density <1> (g/l) | Weight Per Unit Area (g/m$^2$) | Pore-Former (%) | Nitrogen $N_2$ | Carbon Dioxide $CO_2$ |
| Labels | 180 | 320 | 58 | 0.4–0.6 | 1.7NL*/kg | 2.5NL*/kg |
| Beakers | 450 | 260 | 117 | 0.3–0.5 | 3.5NL*/kg | 5NL*/kg |
| Packing Containers | 1200 | 180 | 216 | 0.2–0.4 | 5NL*/kg | 7NL*/kg |

*Standard liters.
<1>: The density refers to a two-layer sandwich, i.e. one layer of polystyrene foam and one co-extruded layer of a thickness of about 10 to 15 μm.

We claim:

1. A method for the production of a multi-layer laminate of a foamed polystyrene film with a co-extruded unfoamed film, for further working into labels or shaped bodies utilizing the shrinkability of the films, wherein the foamed film is formed of a polystyrene resin composition, together with nitrogen as expansion agent and a pore-former, and wherein the material that is foamed by the nitrogen and pore-former and the unfoamed material are extruded concurrently from the nozzle of an extruder and are stretched prior to a cooling below the softening point, wherein the method comprises steps of forming the expansion agent exclusively of nitrogen; and dispensing the nitrogen into the polystyrene resin composition within the extruder, the dispensing of the nitrogen being accomplished per kilogram of foamed film in an amount of standard liters equal numerically to a fraction 1/30 to 1/50 of the weight per unit area of the film (measured in grams per square meter) in combination with a (chemically) decomposable powdered mixture, the stiffness/surface-nature of the film being controlled by the expansion ratio.

2. A method of producing a multi-layer laminate of a foamed film with a co-extruded unfoamed film, for further working into labels or shaped bodies utilizing the shrinkability of the films, wherein the foamed film is formed of polystyrene resin composition together with carbon dioxide as expansion agent and a pore-former, and wherein the material that is foamed by the carbon dioxide and the pore-forming and the unfoamed material are extruded concurrently out of the nozzle of an extruder and are stretched prior to cooling below the softening point, wherein the method comprises steps of forming the expansion agent exclusively of carbon dioxide; and dispensing the carbon dioxide into the polystyrene resin composition within the extruder, the dispensing of the carbon dioxide being accomplished per kilogram of foamed film in an amount of standard liters equal numerically to a fraction 1/20 to 1/35 carbon dioxide (measured in standard liters) of the weight per unit area of the film (measured in grams-per-square meter) in combination with a powdered mixture of sodium bicarbonate and citric acid, the stiffness/surface-nature of the film being controlled by the expansion ratio.

3. A method of manufacturing a multi-layer laminate of a foamed polystyrene film with a co-extruded unfoamed film, for further working into labels or shaped bodies utilizing the shrinkability of the films, wherein the foamed film is formed of a polystyrene resin composition together with an expansion agent and a pore-former, and wherein the material that is foamed by the expansion agent and the pore-former and the unfoamed material are extruded concurrently from the nozzle of an extruder and are stretched prior to cooling below the softening point, wherein the method comprises steps of forming the expansion agent of a mixture of gasses of carbon dioxide and nitrogen, in combination with a powdered mixture of sodium bicarbonate and citric acid, the stiffness/surface-nature of the film being controlled by the expansion ratio;

dispensing the mixture of gasses with the polystyrene resin composition within the extruder, the dispensing of the mixture of gasses being accomplished per kilogram of foamed film in an amount of standard liters equal numerically to a fraction 1/30 to 1/50 of the weight (in grams) per unit area (in square meters) of the film.

4. A method according to claim 1, wherein the proportion of pore-formers lies within a range between 0.2% and 1.0% by weight.

5. A method according to claim 1, wherein the density of composite film lies within a range of about 160 to 340 grams per liter.

6. A method according to claim 1, wherein the thickness of the laminate lies approximately within the range 80 to 1250 μm.

7. A method according to claim 1, wherein polystyrene resin having an average molecular weight within the range of between 20 and $32 \times 10^4$ (measured by the gel-permeation chromatography method) is used.

8. A method according to claim 7, wherein the polystyrene resin is a mixture of high-molecular weight and low-molecular weight polystyrene resins.

9. A method according to claim 1, wherein the polystyrene resin has a low softening point lying within the range of between 89° and 102° C.

10. A method according to claim 1, wherein the polystyrene film is extruded in multi-layer form.

11. A method according to claim 1, further comprising a step of
passing material of the laminate via a nozzle and a cooling mandrel, wherein the expansion ratio (D2/D1) is greater than 1.5, D1 being a cross-section of the nozzle, and D2 being a cross-section of the mandrel.

12. A method of manufacturing a multi-layer laminate of a foamed polystyrene film with a co-extruded unfoamed film, for further working into labels or shaped bodies utilizing the shrinkability of the films, wherein the foamed film is formed of a polystyrene resin composition together with an expansion agent and a pore-former, and wherein the material that is foamed by the expansion agent and the unfoamed material are extruded concurrently from the nozzle of an extruder and are stretched prior to cooling to below the softening point,
wherein the method comprises a step of forming the expansion agent of a mixture of gasses of carbon dioxide and nitrogen in combination with a powdered mixture of sodium bicarbonate and citric acid, the stiffness/surface-nature of the film being controlled by the expansion ratio; and dispensing the mixture of gasses with the polystyrene resin composition within the extruder, the dispensing of the mixture of gasses being accomplished per kilogram of foamed film in an amount of standard liters equal numerically to a fraction 1/20 to 1/35 of the weight (in grams) per unit area (in square meters) of the film.

13. A method according to claim 2, wherein the fraction of pore-former is in the range between 0.2% and 1.0 by weight.

14. A method according to claim 2, wherein the density of the composite film lies within the range of about 160 to about 340 grams per liter.

15. A method according to claim 2, wherein the thickness of the laminate lies approximately within the range of 80 to 1250 μm.

16. A method according to claim 2, wherein polystyrene resin having an average molecular weight within the range of between 20 and $32 \times 10^4$ (measured by the gel-permeation chromatography method), is used.

17. A method according to claim 16, wherein the polystyrene resin is a mixture of high-molecular weight and low-molecular weight polystyrene resins.

18. A method according to claim 2, wherein the polystyrene resin has a low softening point which lies within the range of between 89° to 102° C.

19. A method according to claim 2, wherein the polystyrene film is extruded in a multi-layer form.

20. A method according to claim 2, further comprising
a step of passing material of the laminate via a nozzle and a cooling mandrel, wherein the expansion ratio (D2/D1) is greater than 1.5, D1 being a cross-section of the nozzle, and D2 being a cross-section of the mandrel.

* * * * *